US007590291B2

(12) United States Patent
Bradski

(10) Patent No.: US 7,590,291 B2
(45) Date of Patent: Sep. 15, 2009

(54) METHOD AND APPARATUS FOR NON-PARAMETRIC HIERARCHICAL CLUSTERING

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 11/005,141

(22) Filed: Dec. 6, 2004

(65) Prior Publication Data

US 2006/0136831 A1     Jun. 22, 2006

(51) Int. Cl.
*G06K 9/62* (2006.01)
*G06F 7/00* (2006.01)
(52) U.S. Cl. ......................................... 382/225; 707/5
(58) Field of Classification Search ................ 382/237, 382/225; 707/5
See application file for complete search history.

(56) References Cited

U.S. PATENT DOCUMENTS

| 6,363,160 | B1 | 3/2002 | Bradski et al. ............. 382/103 |
| 6,394,557 | B2 | 5/2002 | Bradski ....................... 302/103 |
| 2003/0210816 | A1* | 11/2003 | Comaniciu et al. .......... 382/171 |
| 2003/0212520 | A1* | 11/2003 | Campos et al. .............. 702/101 |
| 2005/0180647 | A1* | 8/2005 | Curry et al. ................. 382/243 |

OTHER PUBLICATIONS

Fukunaga, The Estimation of the Gradient of a Density Function, with Applications in Pattern Recognition, Jan. 1975, IEEE vol. it-21, No. 1, pp. 32-40.*
Cheng, Mean Shift, Mode Seeking, and Clustering, Aug. 1995, IEEE vol. 17. No. 8, pp. 790-799.*
Silverman, Density Estimation for Statistics and Data Analysis, Chapman and Hall, 1986.*
Wattanachon et al, Agglomerative Hierarchical Clustering for Non-linear Data Analysis, 2004 IEEE, pp. 1420-1425.*
Cheng, Mean Shift, Mode Seeking, and Clustering, Aug. 1995, IEEE, pp. 790-799.*
Wang et al, Robust Adaptive Scale Parametric Model Estimation for Computer Vision, Nov. 2004, IEEE, pp. 1459-1474.*
Comaniciu et al, Mean Sift: A Robust Approach Toward Feature Space Analysis, May 2002, IEEE, pp. 603-619.*
Barash et al, Meanshift Clustering for DNA Microarray Analysis, 2004 IEEE, pp. 1-2.*
Andrew W. Moore "K-means and Hierarchical Clustering" www.cs.cmu.edu. Nov. 16, 2001.
D. Comaniciu and P. Meer, "Distribution free decomposition of multivariate data", Pattern Analysis & Applications. vol. 2. pp. 22-30. 1999.
Wald, Lecture II, "Looking inside the Black Box", Leo Breiman, http://stat-www.berkeley.edu/users/breiman/wasl2002-2.pdf. pp. 19-35. Feb. 2002.

(Continued)

*Primary Examiner*—Brian P Werner
*Assistant Examiner*—Kathleen S Yuan
(74) *Attorney, Agent, or Firm*—Trop, Pruner & Hu, P.C.

(57) ABSTRACT

In one embodiment, the present invention includes a method of forming windows corresponding to a data point of a data set, successively expanding the windows, determining a local hill for the windows, re-centering the windows on the local hill, and merging any of the windows within a selected distance of each other. The windows formed may be substantially the same size as a single data point, in one embodiment. The merged windows may be recorded as possible merge points of a hierarchical cluster formed from the data set. Other embodiments are described and claimed.

16 Claims, 4 Drawing Sheets

OTHER PUBLICATIONS

Andrew Y. Ng, Michael I. Jordan, Yair Weiss. "On Spectral Clustering: Analysis and an algorithm". 2001.

E.M. Kleinberg, "On the algorithmic implementation of stochastic discrimination", IEEE Transactions on Pattern Analysis and Machine Intelligence, PAMI-22, 5, May 2000, Abstract.

Dechang Chen, Peng Huang and Xiuzhen Cheng. "A concrete statistical realization of Kleinberg's stochastic discrimination for pattern recognition. Part I. Two-class classification" Source: Ann. Statistic. 31 (2003), No. 5. Abstract.

* cited by examiner

METHOD AND APPARATUS FOR NON-PARAMETRIC HIERARCHICAL CLUSTERING

BACKGROUND

This invention relates generally to data mining.

Data mining involves the statistical analysis of complex data. In one application, data mining technology may be utilized to cluster data into similar groups. Clustering of data is used in many areas, such as video, imaging and audio compression and scientific applications, among many others.

A data set may include a collection of data points which each has a set of features. For example, a data set may include a collection of "N" data points, each of which has "M" features. Supervised data contains labels or predictors, while unsupervised data lacks such labels or predictors. That is, certain data sets may contain a collection of features and a label or predictor for those features. As an example, a supervised data set may include a collection of features about mushrooms, such as cap type, color, texture, and so on, and a label such as edible, poisonous, medicinal, and so on, or a predictor, such as a numeral value representing the toxicity of a mushroom. A related unsupervised data set may include the collection of features without the labels or predictors.

Hierarchical clustering techniques can be used to cluster data, and particularly for clustering unsupervised data. Such techniques are usually performed as two-way merges (i.e., from a bottom-up) or as splits (i.e., from a top-down) of a data set. Each merger or split represents a branching point. That is, each of the splits is a pair-wise clustering of data. While such techniques are used to cluster data, they do not reflect a natural structure of many data sets. Further, clustering typically requires pre-specification of parameters for the clustering, such as a desired number of clusters.

Thus a need exists to more efficiently cluster data.

DETAILED DESCRIPTION

Figure 1:
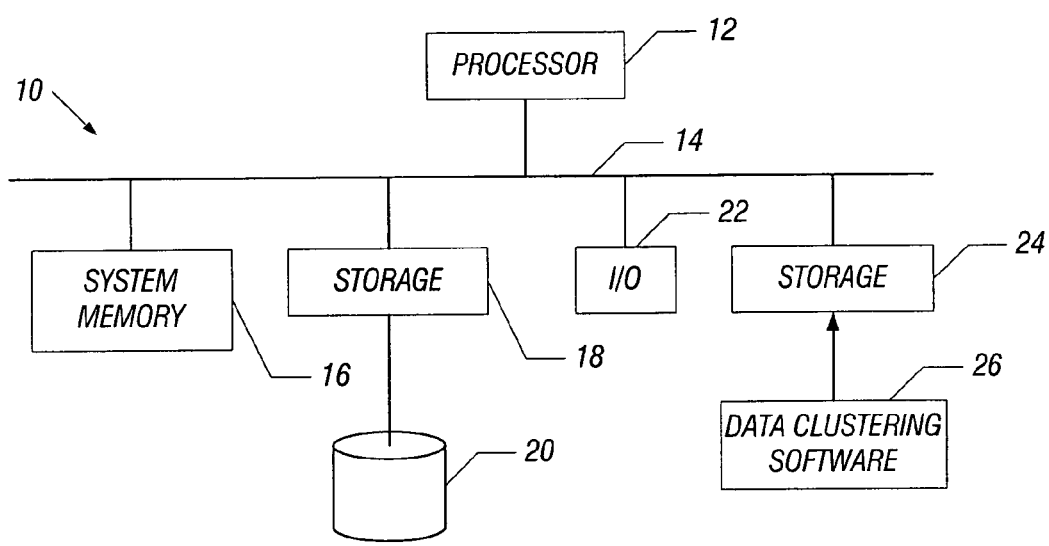
FIG. 1 is a schematic depiction of a computer system in accordance with one embodiment of the present invention.

Referring to FIG. 1, a computer system 10 may include a processor 12 coupled to a bus 14. The system 10 is only an example and the scope of the present invention is not limited to any particular architecture. In a simple example, the bus 14 may be coupled to a system memory 16, which in one embodiment may be a dynamic random access memory (DRAM), a storage 18, an input/output (I/O) device 22, and another storage 24. The storage 24 may store various software, including software 26, which may be a data clustering program in accordance with one embodiment of the present invention. In various embodiments, software 26 may be loaded into system memory 16 prior to execution for faster operation. Of course, multiple software programs may be present. Data to be clustered may be stored in a database 20 associated with storage 18.

As discussed, system 10 is representative and other systems may include more or different components, and such components may be differently arranged. For example, instead of the architecture of FIG. 1, a system may have a hub-based architecture, with a memory controller hub (MCH) coupled between processor 12 and system memory 16, and an I/O controller hub (ICH) coupled between the MCH and I/O devices, such as I/O device 22.

In various embodiments, a hierarchical clustering of a data set may be implemented by placing a window of small size over each data point and then successively expanding the windows. As these windows move to find local hills, where two or more windows meet, such windows are merged. This process may be performed iteratively until all windows have been merged. The merger of the windows can be used to generate a hierarchical tree of data clusters from the largest cluster (i.e., the top cluster) on down through each local hill and further on down to each local data point (i.e., a bottom cluster).

The windows may be referred to as "mean shift windows" in embodiments in which a mean shift algorithm is used to analyze the windows. In these embodiments, a type of mean shift algorithm, which is a robust (i.e., it ignores outliers) statistical method for finding the mode (e.g., a top of a hill) of a distribution of data, is used. Such an algorithm proceeds by finding the mean value in a local window of the data, re-centering the window at this mean location, and iterating until the window converges. That is, in simplest form, the mean shift algorithm: (1) places a window of fixed size in an area of data; (2) finds the center of mass of data (i.e., mean value location) within that window; (3) re-centers the window on the center of mass; and (4) returns to the second stage until the center of mass is converged.

Figure 2:
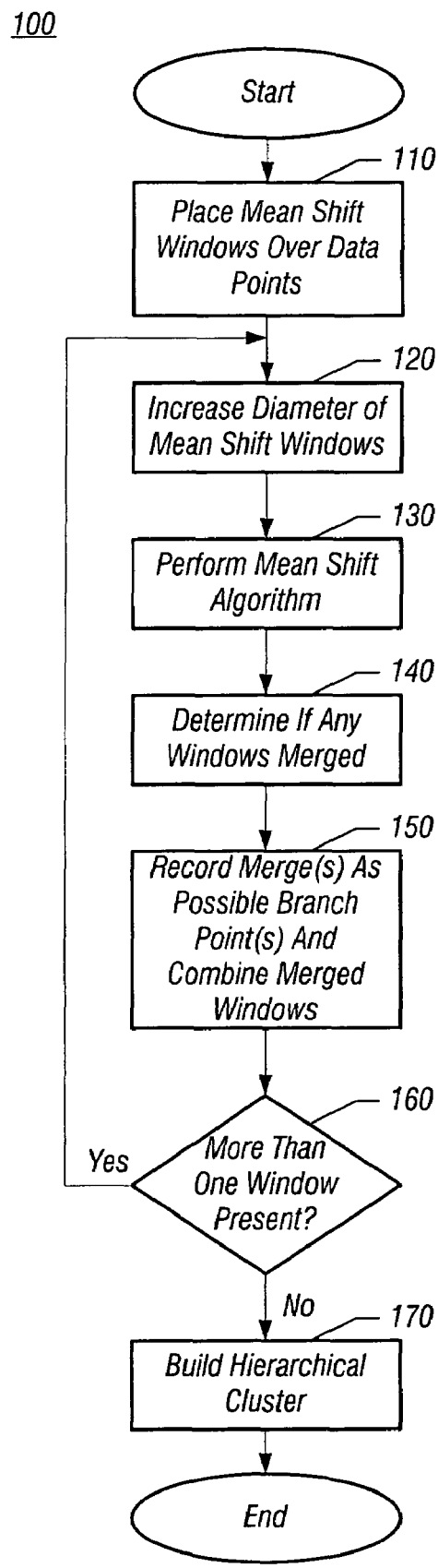
FIG. 2 is a flow diagram of a method of clustering data in accordance with one embodiment of the present invention.

Referring now to FIG. 2, shown is a flow diagram of a method for generating a hierarchical cluster in accordance with one embodiment of the present invention. Method 100 may be implemented as a software routine to form a hierarchical cluster for a data set. For example, method 100 may correspond to software 26 of FIG. 1. As shown in FIG. 2, mean shift windows are placed over the data points of the data set (block 110). In some embodiments, a window of very small or minimal size (e.g., of zero size) may be placed over every data point of the data set. However, in other embodiments to speed up execution, rather than beginning with a small window over every data point, windows may be formed over every $K^{th}$ data point, subject to the starting points being substantially uniform over the space of the data set. In still other embodiments, windows may be formed over a plurality of data points. Such windows may still be relatively small with respect to a density of the data points.

While in different embodiments various window types may be used, in one embodiment the windows may be defined as the Epanechnikov kernel, where the weight of data points falls off as the square and the data points are further normalized for the number of dimensions (i.e., features) in the data as well as the window volume. In other embodiments, for computational speed-up, a hyper-sphere window or a hyper-cube may be used instead.

Next, the diameter of the windows is increased (block 120). For example, the windows may be increased by a small amount. In an embodiment where information exists about the density of the data, a measure of the average distance between data points (or some other density measure) may be used to increment window size. For example, windows may be expanded by a fraction of the average density (e.g., ¼).

Then a mean shift algorithm is performed for each of the windows (block 130). Such an algorithm may be used to determine a local hill (i.e., a mean value location or center of mass of the window). Details of a mean shift algorithm in accordance with one embodiment are discussed below with regard to FIG. 3. In other embodiments, instead of a mean shift window algorithm, another algorithm may be used to determine a window's center of mass.

After determining the local hills, it is determined whether any of the windows merged (block 140). That is, the windows may be checked to see if two or more windows found the same local hill, either identically or within some predetermined distance. For example, a difference may be calculated between the local hills of two or more adjacent windows to compare to a predetermined threshold. The threshold may be user selected, in some embodiments, and may be based on a priori knowledge of the nature of the data. For example, in one embodiment the threshold may correspond to a percentage of the average density, such as 25% of the density.

If any windows are determined to have merged, the mergers may be recorded as possible branch points within the hierarchical cluster to be formed (block 150). In one embodiment, the possible branch points may be recorded in a database to indicate the multiple windows at a given branch point (i.e., local hill). Then, the merged windows may be combined. That is, all but one of the merged windows may be disregarded for further processing (although they are stored in the database), as from the merge point onward the merged windows will follow the same path.

At diamond 160, it may be determined whether more than a single window remains active, after determination of mergers in block 150. If so, control returns to block 120 for further processing.

If instead only a single merged window is still active, the hierarchical cluster may be built (block 170). In one embodiment, the hierarchical cluster may be built starting from the final top cluster (i.e., a single enlarged window) and following branch points (stored as the recorded possible branch points) on down through the hierarchy. The branch points denoted along the way may be analyzed to determine whether they represent true clusters. In some embodiments, at the top of substantial hills, stability may exist until the window size grows enough to cause substantial movement from the hill.

Alternately, a test may be performed such as using the Epanechnikov kernel to check that between each potential cluster, there exists a predefined falling off (i.e., a valley) of data density. That is, one may only count clusters when a substantial density valley (e.g., the density of data points falls off by a predetermined value) was found between the proposed cluster and all other clusters of that level.

Thus, significant data density "peaks" may be discovered, which may come from two or (mostly) more data windows, reflecting the natural structure of the data. In other words, it is the true nature of a data set that determines a hierarchical clustering, rather than pair-wise merges (i.e., bottom up) or splits (i.e., top down). Thus in various embodiments, the clustering is not pair-wise and instead, many data points or regions merge at once.

Figure 3:
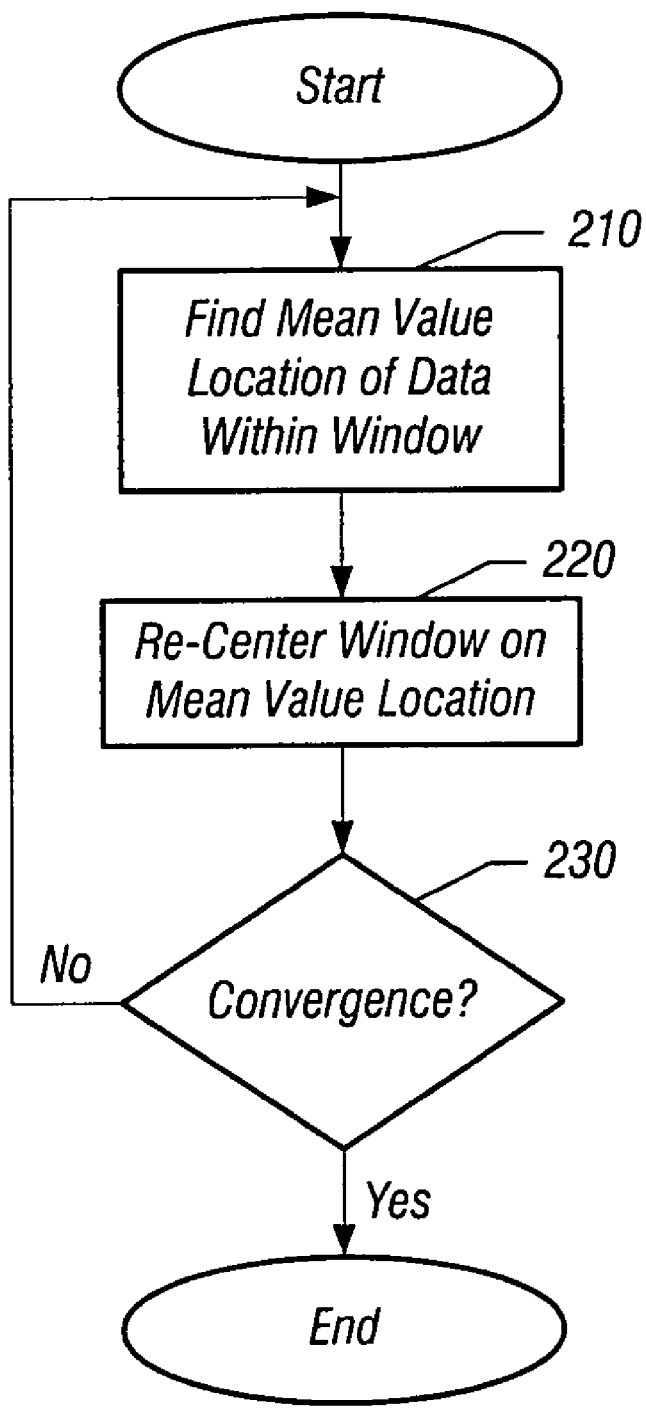
FIG. 3 is a flow diagram of a mean shift method in accordance with one embodiment of the present invention.

Referring now to FIG. 3, shown is a flow diagram of a mean shift algorithm in accordance with one embodiment of the present invention. Method 200 of FIG. 3 may correspond to the mean shift algorithm performed in block 130 of FIG. 2, for example. As shown in FIG. 3, a mean value location is found for the data points within a given window (block 210). The mean value location may be a center of mass of the data points, and may correspond to a local hill. Next, the window is re-centered on the mean value location (block 220). Then it may be determined whether the mean value location has converged (diamond 230). In one embodiment, the mean value location converges when there is no movement in the center of mass between two consecutive windows (i.e., there is no re-centering of the window in block 220). In other embodiments, a threshold may be set and the algorithm may be considered to converge where the change in centers of mass between two consecutive windows is less than the threshold.

If the algorithm has not converged at diamond 230, control returns to block 210 to find the mean value location within the re-centered window. If instead, it is determined that convergence has occurred at diamond 230, the mean shift algorithm ends.

In different embodiments, various parameters may be used to accommodate desired computational complexity and computational speed. Such parameters may include the size of the initial window, how fast the window diameter increases, a predetermined distance or delta to measure merging windows, and/or determining a percentage density value between proposed clusters before they are declared to be true clusters.

Figure 4:
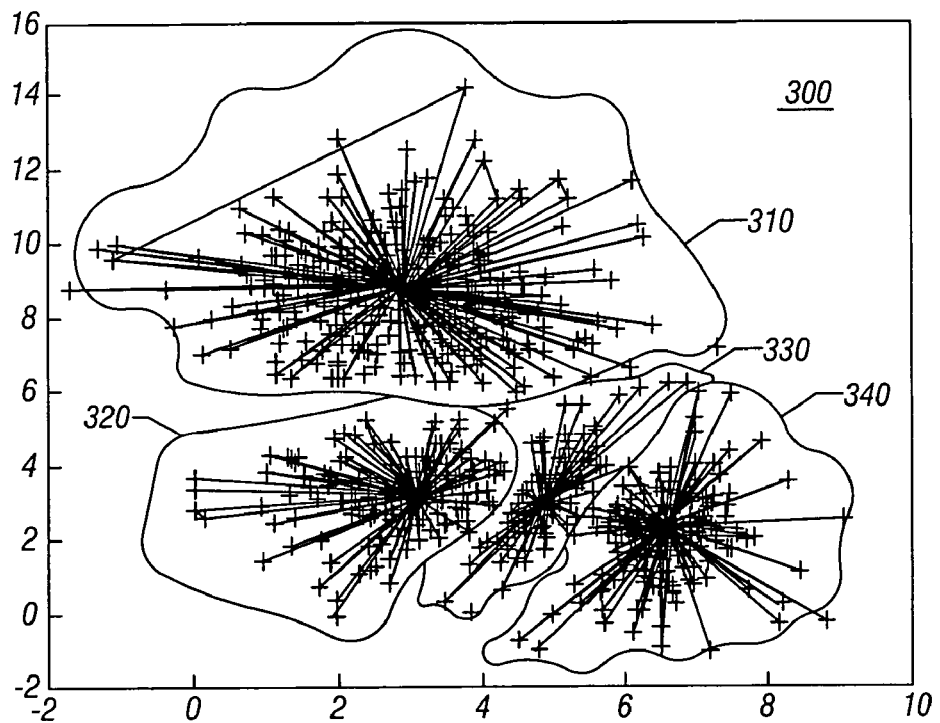
FIG. 4 is a hierarchical clustering of a data set having a plurality of clusters obtained in accordance with an embodiment of the present invention.

Referring now to FIG. 4, shown is a hierarchical clustering of a data set 300 having a plurality of data points therein. As shown in FIG. 4, data set 300 includes many overlapped data points. In accordance with an embodiment of the present invention, small windows may be formed over each of the data points that may be iteratively expanded. The expanded windows may then be tested to find the local hill therein, and then based on a difference between local hills, windows having substantially similar local hills may be merged. As shown in FIG. 4, four clusters 310, 320, 330 and 340 may be found using the expanded windows.

Figure 5:
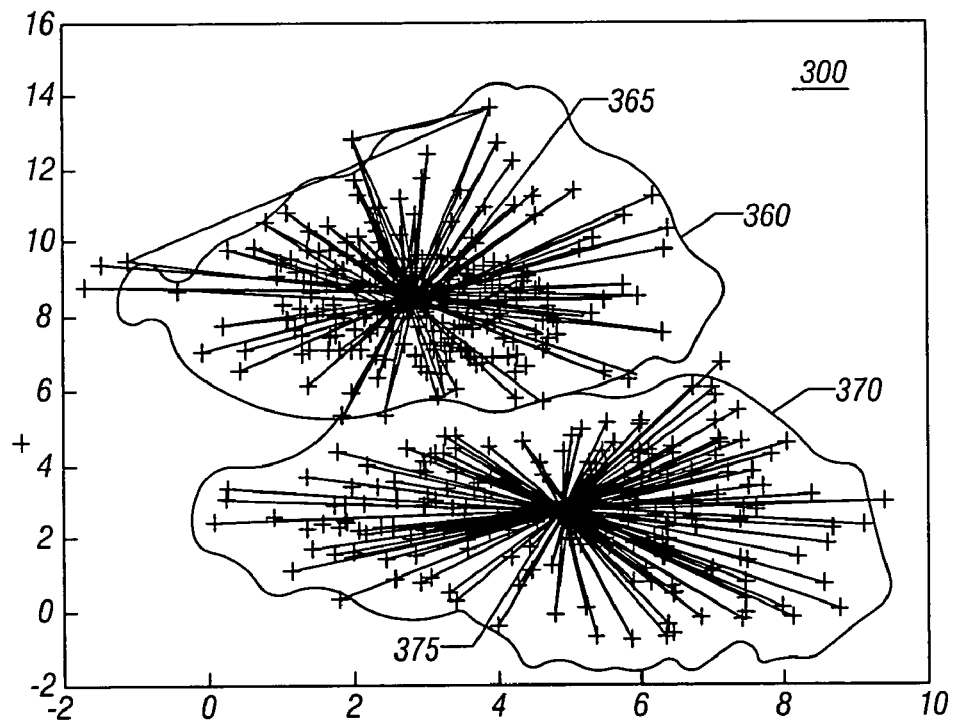
FIG. 5 is the data set of FIG. 4 at a higher level of the hierarchical cluster.

Referring now to FIG. 5, shown is data set 300 at a higher level of the hierarchical cluster. More specifically, FIG. 5 shows data set 300 now segmented into two clusters, namely a first cluster 360 and a second cluster 370. Also shown in FIG. 5 is a center point 365 of first cluster 360 and a center point 375 of second cluster 370. These center points may be determined in accordance with an embodiment of the present invention by iteratively expanding windows, determining a mean value location and re-centering the windows until convergence. It is to be understood that while not shown in figures, a next higher level of the hierarchical cluster of FIG. 5 may include a single cluster of all the data points.

Embodiments of the present invention may be used in various circumstances in order to cluster data into similar groups. For example, embodiments may be used to analyze gene response in deoxyribonucleic acid (DNA) microarrays, video image and audio compression, data mining, automated data taxonomies and finding where to sample code traces and benchmarks for computer architecture design analysis, and the like.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using a memory, coupled to a processor, to receive a data set;
   using the processor to form a plurality of windows each corresponding to a data point of every $K^{th}$ data point of the data set, wherein data points of the data set are substantially uniform over the data set;
   successively expanding the plurality of windows based on information regarding density of the data set, determining a local hill for each of the plurality of windows, and merging any of the plurality of windows within a selected distance of each other, wherein the selected distance is user selected based on a priori knowledge of a nature of the data set;
   recording the merged windows as first possible branch points in a hierarchical cluster;
   generating the hierarchical cluster from the first possible branch points; and
   testing the first possible branch points to determine whether a density valley exists between first and second possible branch points included in the first possible branch points.

2. The method of claim 1, further comprising forming the plurality of windows having a minimal size.

3. The method of claim 1, further comprising successively expanding, determining and merging until a single expanded window exists.

4. The method of claim 1, wherein merging any of the plurality of windows comprises merging more than two windows in a single iteration.

5. The method of claim 1, wherein determining the local hill comprises finding a mean value location of the data points of the data set within each of the plurality of windows and re-centering each of the plurality of windows on the mean value location until the mean value location converges.

6. The method of claim 1, further comprising generating the hierarchical cluster to analyze gene response in DNA microarrays.

7. The method of claim 1, further comprising generating the hierarchical cluster to determine where to sample code traces and benchmarks for a computer architecture.

8. A method comprising:
   using a memory, coupled to a processor, to receive a data set;
   using the processor to form a plurality of windows each corresponding to at least one data point of the data set;
   successively expanding the plurality of windows and merging two or more of the plurality of windows having substantially similar mean values;
   comparing a difference between mean values respectfully associated with first and second expanded windows of the plurality of expanded windows to a user selected threshold corresponding to a percentage of an average density of the data set; and
   recording the first and second expanded windows of the plurality of expanded windows as a possible branch point in a hierarchical cluster if the difference is below the user selected threshold.

9. The method of claim 8, further comprising determining a mean value for each of the plurality of expanded windows by successively finding a local hill of data points in each expanded window, and centering each expanded window on the local hill until convergence occurs.

10. The method of claim 8, further comprising generating the hierarchical cluster from a plurality of possible branch points.

11. The method of claim 8, further comprising forming the plurality of windows having a size substantially equal to the corresponding at least one data point.

12. The method of claim 8, wherein the plurality of windows comprises Epanechnikov kernels, hyper-spheres, or hyper-cubes.

13. A computer-readable storage medium containing instructions that when executed enable a system to:
   form a plurality of windows each corresponding to at least one data point of a data set;
   successively expand the plurality of windows based on information regarding an average density of the data set and merge two or more of the plurality of windows having substantially similar mean values;
   compare a difference between mean values respectfully associated with first and second expanded windows of the plurality of expanded windows to a user selected threshold corresponding to a percentage of the average density of the data set; and
   record the first and second expanded windows of the plurality of expanded windows as a possible branch point in a hierarchical cluster if the difference is below the user selected threshold.

14. The article of claim 13, further comprising instructions that if executed enable the system to determine a mean value for each of the plurality of expanded windows by successive discovery of a local hill of data points in each expanded window, and movement of a center of each expanded window to the local hill until convergence occurs.

15. A system comprising:
   a processor; and
   a dynamic random access memory including instructions that if executed enable the system to form a plurality of windows each corresponding to at least one data point of a data set, successively expand the plurality of windows based on information regarding an average density of the data set and merge two or more of the plurality of windows having substantially similar mean values, compare a difference between mean values respectfully associated with first and second expanded windows of the plurality of expanded windows to a user selected threshold corresponding to a percentage of the average density of the data set and record the first and second expanded windows of the plurality of expanded windows as a possible branch point in a hierarchical cluster if the difference is below the user selected threshold.

16. The system of claim 15, further comprising instructions that if executed enable the system to determine a mean value for each of the plurality of expanded windows by successive discovery of a local hill of data points in each expanded window, and movement of a center of each expanded window to the local hill until convergence occurs.

* * * * *